Patented Aug. 7, 1934

1,968,846

UNITED STATES PATENT OFFICE 1,968,846

PROCESS OF MAKING STRUCTURAL ADSORPTIVE CARBON AND PRODUCT

Jacque C. Morrell, Oak Park, Ill.

No Drawing. Application January 28, 1933, Serial No. 654,111

21 Claims. (Cl. 252—3)

This invention relates to the production of adsorptive or activated carbons. More particularly, it relates to an improvement in the concepts and processes of my previously issued patents for the production of adsorptive charcoals or activated carbons. These issued patents are #1,478,985, December 25, 1923, Artificial or synthetic charcoal and process of producing the same; #1,478,986, December 25, 1923, Manufacture of artificial charcoal; #1,478,987, December 25, 1923, Production of adsorbent charcoal; #1,530,392, March 17, 1925, Process of making compound adsorbent catalysts; #1,530,393, March 17, 1925, Process of making adsorbent carbon. The present application is a continuation in part of my application No. 608,852, Process of making structural adsorptive carbon and product, filed May 2, 1932.

It is the principal object of this invention to produce structural adsorptive or activated carbons. In activated carbons of this type it is very important that the supporting walls of the individual particles be dense or firm and that the particle or granule itself possess the necessary structural strength required of the granular type of carbons. As examples are the carbons which possess sufficient structural strength to permit their use in filter columns or beds without excessive disintegration, comparable to bone black, such as is employed in filter columns in the refining of sugar, or to the activated charcoals such as cocoanut char used for vapor adsorption from gases, in gas masks, catalysts, etc. The structural strength of these and other types of chars is of highest importance since the life of the material depends upon its maintaining its original size and granular form. The term "structural activated carbon" as used herein further means a material which may be employed in a granular condition and implies the necessary structural strength to withstand or resist shattering, abrasion and crushing for practical purposes and to be retained in a granular or particle form of relatively large size.

The product of the present process may be employed in various industrial processes as a decolorizing and purifying agent for the removal of color and impurities from liquids and solutions, the removal of vapors from gases, purification of air, as a catalyst, and in general it may be applied wherever adsorptive decolorizing or purifying material of structural character is required. It is to be understood, of course, that the structural product may be reduced in size and may be used in a finely divided or powdered condition. Among its specific uses are the refining and decolorization of oils and their derivatives; the refining and decolorizing of mineral, animal and vegetable oils; as a catalyst; for decolorizing, purifying and refining sugar solutions, syrups such as those from cane, corn, maple and sorghum, glycerine, and aqueous and non-aqueous solutions of organic and inorganic compounds; purification of water and as a deodorant. Other uses are: purification of gelatins, phenols, drugs, medicinals, pharmaceuticals, and the bleaching and purification of various crude and partly refined off-grade and off-flavored food and vegetable oils, including cottonseed, linseed, rapeseed, cocoanut, soya bean, and animal oils and fats, such as lard, fish oils, medicinal oils, paint oils, varnishes and resins, garage wastes, etc.

In a broad aspect the present invention comprises mixing finely divided carbons with a binder which chars on heating, compressing, molding, briquetting or extruding this mixture, or in general a mixture of carbon and a binder which chars on heating, under a substantial pressure, subjecting the mixture to a temperature adequate to carbonize the said binder and thereafter to an activation treatment, such as treatment with steam at elevated temperatures or with other mild oxidizing agents. Preferably the molded or briquetted product is comminuted before carbonizing but there may be conditions under which it is carbonized, or partially carbonized, first and then comminuted. In some cases the product is subsequently treated with a solvent such as hot water and/or dilute acid to remove ash or inert substances therefrom. The final product of the present invention is of a granular structural form of suitable size and may be employed in filter columns, beds, etc.

The best types of structural charcoals or carbons are those which possess a large degree of porosity of the duct or sponge type, i. e., continuous, the pores, ducts or capillaries of which are of the proper size and character, while at the same time having the necessary supporting structural or mechanical strength to withstand disintegration in the uses for which such structural chars are employed. It is this quality that is supplied to the product by molding, compressing, briquetting or extruding under pressure. To further assist in obtaining the necessary strength while maintaining adsorption efficiency mixtures of specific types and in some cases specific proportions of carbons, as well as in some cases specific types and proportion of binders, are employed in connection with the present invention.

In compressing, briquetting, molding or extruding the pressure may vary from several hundred pounds per square inch or sufficient pressure only to mold the mixture to several hundred tons. Preferably in excess of one ton per square inch is employed.

In one of its more specific aspects the invention comprises mixing a relatively active carbon with one which is less active, or relatively inactive, by mixing the two types and/or subjecting a mixture of the same to the treatment described. A relatively inactive carbon such as coke from distillation and/or cracking of petroleum, coal and the like, and cokes from the destructive distillation and cracking of various tars such as coal tar, lignite tar, gas tar and retort cokes generally, etc., or from the destructive distillation of corresponding pitches, asphalts and the like, as well as coals such as anthracite, semi-anthracite, bituminous and sub-bituminous coals, and in general carbons derived from materials of a mineral character, is mixed with a more active carbon such as wood charcoal, particularly from hardwood, and chars such as those from straws, hulls and vegetable matter in general, including chars from various waste materials such as wood waste, shavings, the stalks, husks and cobs from corn, bagasse from sugar cane, nut hulls and shells, fruit pits, alcohol slops, waste liquors from various industries such as that from the paper industry and carbons of animal origin, such as bone black, blood char, leather char, etc., and the mixture of inactive and active carbons is mixed with a binder which chars on heating, such as a tar but preferably with pitches from various tars or asphalts and pitches from petroleum, either by straight distillation or cracking of the same, and the like. The three major components of the mixture are thus a relatively inactive carbon, in general of mineral origin, an active carbon and a binder which chars on heating. The coke obtained from petroleum coke either by straight distillation or cracking of petroleum or its fractions to a coke residue, is preferred as the relatively inactive carbon. Vegetable carbons, particularly hardwood charcoals, are preferred as the relatively active carbons. Coal tar and preferably the pitches obtained from coal tar are the preferred binders.

The active carbon for present purposes may be defined further as that produced from the carbonization, particularly of vegetable and animal matter, and may include the carbons from the incomplete combustion (smoky flame) of gases wherein the carbon is deposited at relatively low temperatures, e. g., carbon black and lamp black, whereas inactive carbon may be defined, e. g., as that resulting from the coking of solid or liquid mineral carbonaceous or hydrocarbon substances such as those cited, e. g., petroleum and coal, including anthracite, bituminous coal, and tars obtained therefrom, and in general the carbon residues remaining from the destructive distillation of tars, particularly from those of mineral origin but which may include tars obtained from other sources. Because of its distinctly vegetable character, carbon obtained from peat may be considered as a vegetable carbon and an active carbon. Carbon from the destructive distillation of lignite may be considered as a mineral carbon and for purposes of the present classification may be inactive, especially with respect to the more active types cited, e. g., hardwood charcoal. Carbon from the destructive distillation of lignite may be active, however, with respect to the inactive class, e. g., cokes from petroleum and coal, and since a more desirable activated carbon from a structural or mechanical viewpoint may result from mixtures therefrom this feature is contemplated within the scope of the invention, although it is not a preferred mixture. It is to be understood that various combinations of the three major components selected from the various groups shown above are not equivalent and that the choice of the individual components will depend on the quality of product desired not only with respect to adsorption or decolorizing efficiency but also with regard to structural strength.

The mixture of carbons and binder is compressed, molded, briquetted or extruded, preferably comminuting the molded or compressed product, heating to carbonize the binder and then activating, usually by heating in the presence of steam. The final product may then be treated with a dilute acid such as hydrochloric acid, e. g., approximately 1 to 3 per cent, to remove undesirable ash components and may then be finally water washed.

The final product is granular in form, structural in character, and may be comminuted to proper size as desired.

Some of the existing theories regarding active and inactive carbon indicate that an active carbon is essentially free from adsorbed stabilized hydrocarbons which are normally associated with it and which reduce its power of combining with other substances, and is also free from inactive carbon formed by the decomposition of hydrocarbons upon its surface at relatively high temperatures, e. g., above approximately 1000° F.

In the present invention the types of carbon which I denote and classify as active carbons are of such character that when such binders for example as coal tars or petroleum pitches and asphalts are added to them, as well as any hydrocarbons which may be associated therewith prior to the incorporation of the binder, when heated and decomposed under the existing temperatures employed for carbonization, e. g., 1200° to 1500° F., do not cause the deposition of inactive carbon which cannot be activated by the methods described herein, e. g., by steam activation or by other usual methods, and these include in general the carbons of vegetable and animal origin. On the other hand, when the carbons which I designate as inactive carbons, and these in general are of mineral origin, such as cokes from petroleum, coal, etc. or from the destructive distillation of tars therefrom, are associated with a binder such as a petroleum asphalt or coal tar pitch and heated above, e. g., 1200° F. do not permit the production of a satisfactorily active product for practical purposes. One aspect of the present invention is readily illustrated by the following examples:

A mixture of petroleum coke and coal tar pitch employed in the ratio of 1.9 parts by weight of petroleum coke to one part of coal tar pitch when made up in accordance with the method described in the present invention showed a decolorizating efficiency of approximately 35 per cent on a standard raw sugar solution. When approximately 12½ per cent of finely divided hardwood char was mixed with the petroleum coke, also in a finely divided condition, employing the same ratio of coal tar pitch and of the same character and processed in identically the same manner as in the first example, the decolorizing efficiency of the last product when tested in the same manner was approximately 70 to 80 per cent. The structural and mechanical strength of this product was much improved and was also very greatly superior to the product made from the active carbon itself. A similar comparison was obtained when a petroleum residue, e. g., a cracked petroleum residue, was employed as the binder in both cases.

While binders like those from tars or pitches from wood or similar types from vegetable and animal sources give a relatively active product with the inactive carbons, due no doubt to the deposition of active carbon thereon, the structure or mechanical strength of these carbons is quite inferior to those wherein pitches and tars from coal and petroleum are employed.

The binders used in the present case are generally those which char on heating, preferably of a hydrocarbon character, such as pitches and tars, preferably pitches, the latter being in general the residues produced from organic substances, such as oils, tars, etc. when subjected to destructive distillation in complete or partial absence of air and to such an extent that a complete carbon residue is not produced and which may be a heavy or viscous liquid, semi-solid or solid, the latter usually softening or liquefying when heated.

Some of the common classes of pitches are: (a) Tar pitches, which include those produced from the tars of wood, bone, coal, shale, lignite, peat, straw, vegetable matter and bitumens, water gas and oil gas tars; (b) Oil pitches, including the residues from distillation and cracking of animal, vegetable and petroleum oils of asphalt, paraffin, naphthene or other base; (c) Pitches from destructive distillation of animal and vegetable matter, including those of stearin, palm oil, bone fat, packing house fat, garbage, sewage, grease, etc; (d) Pitches resulting from the destructive distillation of native bitumens, asphalts, asphaltites, etc. Various oils (in many cases from the tars mentioned above) may be used in conjunction with the above pitches as binders, e. g., coal tar oils, wood tar oils, petroleum oils, particularly cracked petroleum residues, etc. Preferably pitches from coal or the corresponding tars thereof and pitchy or heavy liquid residues from petroleum, both from straight distillation and cracking, are preferred, the coal tar pitches being the most desirable, especially for structure and hardness of the resulting product. Depending upon the results desired, the pitches employed may be solid, semi-solid or liquid, or combinations thereof together or with tars or oils.

In connection with the selection of the binders consideration is given to the efficiency and structural strength of the product desired. This refers to the sources of the binder as well as to its physical form, i. e., whether it is a heavy hydrocarbon fluid residue, tar, pitch or asphalt, etc.

Sufficient pitch may be present with the coke as produced, e. g., from petroleum and tars, to enable it to be molded or compressed directly without further addition of binder and the present invention contemplates the use of carbonaceous materials of this character. These types may be reduced to a finely divided condition, adding the necessary amount of wood char or other vegetable char or active char, and then molding or compressing the mixture and following the process as described, i. e., charring and activating. If there is an excess of pitch present additional carbon of the coke type may be added and the amount of wood char or other active char in the mixture regulated accordingly. If there is insufficient pitch present additional binding material, e. g., coal tar pitch, may be added. Where sufficient pitch is present in the coke it may be necessary to add only sufficient oil or tar to the mixture to compress and mold the mixture. Coke from the cracking of petroleum and its derivatives, particularly that obtained from the cracking of an asphaltic or naphthenic base oil (although the same may apply to the coke obtained from the cracking of other types of oils), which contains approximately 15 per cent or upward of volatile matter and which has caking properties, may be of this general character. For example, with a coke from a mixed base oil of Mid-Continent or West Texas characteristics containing approximately 18 per cent of volatile matter the ratio of total carbon to pitch binder added (in this particular case coal tar pitch) was increased from approximately 2 to 1 (used for coke containing less than approximately 8 per cent volatile matter) to approximately 5 to 1, or somewhat more or less depending upon the character of the coke, e. g., 3 to 6 parts carbons to 1 part binder. The method of mixing the pitch in this particular example was either in an emulsified form such as has been heretofore described or by incorporating finely divided pitch in the carbon mixture (containing e. g., 88 per cent of the aforementioned coke and 12 per cent of wood char), employing a ratio of approximately 4 parts of the carbon mixture to 1 part of the hard pitch binder, and adding oil directly or as emulsions to the mixture.

The percentage of oil required when employed in the mixture may vary somewhat depending on the type of oil and method of mixing (e. g., whether the binder is incorporated as an emulsion or direct) from approximately 25 to 60 per cent by weight of the hard pitch. When the finely divided pitch is incorporated directly into the carbon mixture without dispersing it in an aqueous medium first the oil may be added as an emulsion or direct, and in some cases the process may be reversed by adding the oil, e. g., as an emulsion to the carbon mixture and then incorporating the finely divided hard pitch binder.

It is important to note that the particles resulting from comminuting the compressed mixture containing coke, active carbon and binder, may undergo little or no fluxing or bridging together when carbonized even though the coke itself in the mixture shows this tendency. This results in great saving in loss of fines if the material is crushed to size after carbonization, as fines before carbonization can be recompressed.

These specific examples are given simply by way of illustration to indicate that with increase in binding material present in the coke employed the amount of binding material to be added to the mixture of active and inactive carbon may be considerably reduced (and in some cases may even be eliminated) and the final product may be entirely satisfactory in respect to its adsorptive or decolorizing properties as well as structural strength.

It is to be pointed out particularly that the above generalizations may apply to both cracking-still and coking-still coke as well as coke from various tars such as those from coal, lignite and in some cases wood tar and the like. It may be well recognized that the degree of coking and the product produced in respect to volatile matter may be controllable and that coke products containing various percentages of pitch may be produced from the various raw materials cited or similar raw materials, the amount of additional binder comprising, e. g., pitch and/or tar or oil, to be added depending as described upon the amount of binder naturally present in the coke as the result of the method and conditions of production of the coke itself.

A similar condition to that described above with respect to binder requirements may exist with respect to coal, particularly with bituminous coals for which the amount of binder required for the coal and active carbon mixtures will be much less than that required for anthracite coal or low volatile coke. While their use is contemplated within the scope of the invention the coals are not necessarily equivalent to the cokes.

In the following methods the relatively inactive and active carbon mixture will be referred to as "carbons".

While I prefer to employ the process of mixing the carbons with an emulsion of a binder, the preparation of which is disclosed in my patent, serial #1,440,356, or with emulsions of suitable binders prepared in some other manner, other methods of incorporating the carbons with the binder may be employed as disclosed in the aforementioned issued patents and/or hereinafter. Some of the methods of accomplishing the mixing are:

(a) The carbons may be mixed directly with the emulsified binder either as such or the carbons may be suspended in or wetted by an aqueous medium and mixed with the emulsified binder. In many cases the water contained in the emulsion will be separated from the mixture by filtration and by evaporation, or preferably by evaporation alone, but in some cases the mixture containing the emulsion may be compressed or briquetted directly before comminuting and/or heating to carbonize the binder.

(b) The carbons may be mixed with a solution of a binding material which chars on heating, separating the solvent by distillation and/or evaporation either before or after compressing the mixture as found necessary or desired. The solvent may be a relatively low boiling hydrocarbon liquid containing pitch or asphalt dissolved therein, or higher boiling solvents may be used.

(c) The carbons may be mixed with a liquid binder which chars on heating, such as a tar directly produced or similar product thereto, such as an oil added to a pitch.

(d) The carbons may be mixed with a soft pitch directly or one which is rendered fluid by heating. In some cases mixing may be facilitated under heat, i. e., the mixture is heated while mixing.

(e) The carbons may be mixed with a non-fluid (solid) pitch or other non-fluid binder which chars on heating and may also thereafter be mixed with or wetted or moistened by a fluid such as oil, tar of the character previously referred to in connection with the present invention, or other organic liquid which will dissolve, disperse or flux with the binder. It is desirable to mix the mixture of carbons and non-fluid pitch binder with an oil or tar before compressing but where no liquid is employed the mixture is heated before and/or during compression. It is to be understood, however, that it may be heated even when the wetting liquid is employed. The moistening or wetting liquid added to the mixture of carbons and the binder may also be in an emulsified state and this is especially desirable in many cases. Oils and tars, including cracked fluid hydrocarbon residues, are preferred in this connection. The oil emulsion may be prepared as described previously. In some cases the carbons may be wetted with oil either direct or in an emulsified condition and the finely divided hard pitch thereafter incorporated or various combinations of the methods described may be employed.

(f) The carbons may be mixed with a nonfluid water soluble or dispersible binding material which chars on heating, such as glucose, starch, waste sulphite liquor pitch, etc. and moistened with water, or a solution of a solid water soluble binder may be employed.

In general, the preferred methods of mixing the mixture of active and inactive carbons with the binder are (a) and (e). In (a) the water is preferably kept at minimum to permit direct evaporation and/or compression. In some cases the compressed or molded material is gently dried before carbonizing. In (e) the oil or tar is added either directly to the mixture of binder and carbon or preferably as an emulsion.

However, all of the above methods are effective, although it may be readily understood that they are not eqivalents.

In all cases above the mixture is compressed, molded, briquetted or extruded under pressure, subjected to heat treatment to carbonize the binder, preferably after comminuting to proper size, and activated in most cases by steam treatment and/or other treatment. In some cases the molded product may be partly or wholly carbonized and thereafter comminuted to proper size, although it has been generally found preferable to comminute before carbonizing.

In some cases it may be desirable to add to the mixture of carbons and binder a substance which is to be later removed by solution with a solvent, e. g., calcium carbonate, calcium oxide, dolomite, finely divided metals, metal oxides, salts, etc. These substances may be removed from the product preferably after activation by treatment with a solvent, e. g., water when the material is water soluble, and a dilute acid, e. g., hydrochloric, when the material is acid-soluble. Also, in the case of mixtures with carbon containing ash naturally, e. g., wood charcoal, the final product may be subjected to treatment with hot water and/or an acid, e. g., hydrochloric acid, finally water washed and dried to remove the undesirable ash. In most cases in the present invention an acid treatment of the product is desirable. It may also be desirable to add substances to the material which volatilize and/or react with the carbonaceous material during the treatment, such as zinc chloride, phosphoric acid and similar materials.

It is to be understood that the methods and various modifications thereof described above, or in general in the foregoing, are not to be considered as equivalents in the sense of quality of product or results produced, the particular method and combinations chosen depending upon the raw materials employed and the results desired.

The term "carbon" as herein employed is intended to cover pure carbon as well as a mixture of natural or artificial origin containing a high percentage of carbon. This includes the various charcoals and carbons of animal, vegetable or mineral origin.

The following description shows one of the methods of operating the process. Finely divided carbon comprising a mixture of petroleum coke and hardwood charcoal may be mixed with water containing a protective colloid to make a thick paste of the same. This preliminary wetting is desirable, although not necessary. The protective colloid may consist of any of the classes of materials described in my issued Patent #1,440,-356, e. g., ammonium tannate or casein. The latter is prepared by dissolving the casein in a dilute solution of an alkali, e. g., sodium hydroxide, sodium carbonate, ammonia, etc.

An emulsion of pitch is prepared, e. g., by first suspending finely divided hard pitch, e. g., coal tar pitch sufficiently hard to grind or otherwise comminute, e. g., 200-300° F. melting point in water containing a protective colloid, e. g., casein dissolved in an aqueous solution of sodium carbonate and an emulsion of an oil may be prepared, e. g., a coal tar (or other tar) distillate, e. g., anthracene oil, creosote oil, or the like, by agitating the oil with an equal volume of an emulsifying agent, which consists of water containing dissolved therein one of the classes of protective colloids previously referred to e. g., casein dissolved in an alkali solution. The suspension of pitch and emulsion of oil are mixed and the resulting emulsified binder is mixed with the finely divided carbon mixture. The water is removed, e. g., by filtration and subsequent evaporation or in most cases and preferably simply by evaporation alone, and the mixture is then compressed, molded, briquetted or extruded.

In some cases the material may be directly compressed without drying, or it may be dried after compression. The compressed or molded material may then be crushed or comminuted and is then subjected to heat treatment to carbonize it. The carbonized product may then be subjected to activation by steam treatment or by other oxidizing gas, such as air, chlorine, flue gas and the like, or other activating treatments. In the present example when wood charcoal, e. g., hardwood charcoal, or similar carbon base is employed the carbonized and steam treated char is preferably subjected to treatment with hot water and/or dilute acids, such as hydrochloric acid, to remove ash and other impurities, subsequently water washed and then dried. In the compressing or molding process pressures varying from several hundred pounds per square inch or only sufficient to compress the mixture up to several hundred tons may be employed.

In the carbonizing treatment temperatures of from approximately 1000° F. to 1800° F., more or less, may be employed. Temperatures of 1300° F. to 1500° F. are preferred. For steam activation or other gas activating treatments temperatures of from 1200° F. to 1800° F., more or less, may be employed with preferred temperatures of 1600° F. to 1750° F. The acid concentrations for the treatment of the activated products (when employed) may vary from less than 1 per cent to 10 per cent and upwards and various acids may be employed, such as hydrochloric, sulphuric, etc., preferably the former. During carbonization and activation the time of treatment will depend upon temperature conditions as well as other conditions and schedules varying from fifteen minutes up to several hours and longer have been employed.

A more specific example describing the preparation of decolorizing and/or adsorbent charcoal according to my process is given below.

The raw materials used in this particular case are petroleum coke, e. g., from the cracking or distillation of petroleum or its fractions, and charcoal, preferably from hardwood such as maple, oak, hickory, birch, beech and the like, of approximately 50 mesh and upward, around 200 mesh being preferred. Coal tar pitch (which is preferred for the structural type of charcoal in this case) of approximately 200 to 250° F. melting point, or of sufficient hardness to be ground, is employed in making the suspension of the binder. The pitch is ground approximately 50 mesh and upward, preferably by first crushing and then grinding, using a protective colloid such as casein which is dissolved in an alkali solution, preferably sodium carbonate solution or dilute ammonia. Creosote oil from the distillation of high temperature coal tar or other liquid hydrocarbon, preferably a coal tar distillate, is emulsified in the solution made by dissolving casein in an alkali, such as sodium carbonate. The emulsion of oil is added to the suspension of pitch, or vice versa, to prepare the emulsified binder, as disclosed in my Patent #1,440,356. Other methods may be employed in preparing the emulsified binder. As an example of the preparation of the casein solution, approximately 1 per cent by weight of sodium carbonate may be dissolved in water, the solution heated to approximately 150° F. and into the heated alkaline solution is stirred approximately 2 per cent by weight of casein. The solution is preferably allowed to cool before using.

The solution may be diluted before making up the pitch suspension, which may be prepared by adding an equal part by weight of the diluted solution to the finely divided pitch and stirring and/or grinding. To this is added an emulsion of oil, preferably from coal tar, e. g., creosote or anthracene oil prepared by emulsifying the oil in an equal part of the aforementioned casein solution. In preparing this emulsion the oil may be added slowly to the casein solution and vigorously agitated during or between additions until the required quantity of oil has been added. The oil emulsion is then mixed with the pitch suspension, the resulting system containing a stable emulsion of soft pitch in the proportion, e. g., of 40 to 60 parts of the creosote oil for each 100 parts of the hard pitch. It is desirable to add to the emulsion of soft pitch prepared as described a small amount of ammonium tannate solution (a solution of tannic acid containing a small amount of ammonia) to stabilize the same.

A mixture of petroleum coke and hardwood charcoal employing from 10 to 25 per cent of hardwood charcoal in this particular example, preferably around 12 per cent, in finely divided form, e. g., of approximately 50 to 200 mesh, is then mixed with the emulsion. In some cases the carbon mixture may be moistened with some of the dilute casein solution. As one example, the final mixture of creosote oil, pitch and charcoal may contain approximately 40 to 50 parts of oil, 100 parts of pitch and 190 parts of carbon mixture (coke 88 per cent and wood charcoal 12 per cent) by weight, and in addition there will be present very small proportions of soda ash or sodium carbonate and casein. These proportions may vary considerably, the above example being given in connection with a superior structural charcoal. The proportions of carbon may generally vary from approximately 160 to 600 parts relative to the pitch, depending upon the amount of volatile matter and/or pitch present originally in the coke and other factors, e. g., for a completely devolatilized coke 1.9 parts of carbon to 1 part of pitch may be employed, and for a coke containing 20 per cent of volatile matter, e. g., from a cracking operation, 5 parts of carbon mixture to one part of pitch may be employed. These figures are given simply as examples, although they represent desirable working proportions.

As a general rule, only sufficient water is present in the emulsion to permit thorough mixing with the carbon, and the water may then be removed or separated by evaporation or other means. In some cases the carbon is wetted with the aqueous medium and then mixed with the emulsified binder. In such cases the water may be somewhat in excess of an equal quantity relative to the suspended materials and filtration may then be desirable to separate part of the water, the mixture then being dried by evaporation or otherwise. It is preferred, however, to have only sufficient water present so that the materials may be thoroughly admixed and then dried directly by evaporation. In some cases the mixture may be compressed before or without drying.

During drying lumping may occur, and it may be desirable that the mixture be kept in more or less a state of agitation to obtain proper drying, although this will depend upon circumstances. It is not necessary that the mixture be completely dried as the presence of small amounts of water facilitates molding or briquetting. In some cases the mixture of emulsified binder and carbon may be compressed or molded directly, the amount of water in such cases being kept to a minimum. The mixture, preferably while warm or heated, is compressed, molded or briquetted, preferably under pressures, e. g., from one ton to ten tons per square inch, e. g., I have found pressures of 2.5 tons per square inch quite satisfactory as a working pressure, although any suitable pressure which gives the desired results will suffice. The compressed material is then carbonized. Preferably the compressed or molded product or briquettes are first crushed and/or ground to the desired size before carbonization. In some cases they may be ground to, e. g., 8 mesh and upwards, carbonized and then subsequently further treated, or they may be reduced to smaller size if desired for further treatment. If used for filtering liquids the product prior to carbonizing may be reduced to smaller size as desired, e. g., 10 to 20 mesh and smaller. The principal question here is to avoid losses in going through several grinding operations. Fines accumulating before carbonizing may be recompressed again. In some cases the molded material is carbonized directly and then comminuted or crushed and/or ground to proper size. It is preferred, however, that the molded product be comminuted before carbonizing.

While I have described in detail the preparation of a mixture by one of the methods employed in the present invention in preparing the mixture of carbon and binder, it is to be understood that other methods such as those previously described may be employed, e. g., the carbons (e. g., coke and wood char) may be mixed directly with a soft pitch binder (preferably under heat) or a solution thereof, or with a finely divided hard pitch binder alone or by the addition later of a small amount of oil or tar or other solvent for the binder and in various combinations, and in general with a binder which chars on heating, and subsequently compressed and subjected to carbonization and/or to the other treatments described in accordance with the process. For example, a very satisfactory structural charcoal of high decolorizing and refining efficiency has been prepared by employing 1.9 parts of a mixture of carbons (containing 87½ per cent of devolatilized petroleum coke and 12½ per cent of hardwood charcoal), 1 part of coal tar pitch approximately 200 melt point, all in finely divided form and well mixed, and 0.25 parts of creosote oil added and mixed with the mixture later. The product was then molded, comminuted, carbonized, activated and acid treated as described. When a coke containing 20 per cent volatile matter was employed (this coke caked or fluxed at high temperatures) a ratio of 5 parts of the mixed carbons (coke and wood char) to 1 of the pitch binder and 0.5 parts oil was used. These proportions and the methods of mixing are simply illustrative and by way of example only.

In the carbonization operation, heating schedules from twenty to sixty minutes at temperatures varying from 1200° F. to 1500° F. have been found satisfactory. Generally speaking, carbonization in thin layers is preferred. The use of a continuous rotary type of retort has been found satisfactory. The principal object here is to heat the material uniformly and prevent formation of secondary inactive carbon. After the carbonization treatment the product is subjected to a second heat treatment in the presence of steam at temperatures between approximately 1500° F. and 1800° F. for about twenty minutes to two hours. In some cases it has been found desirable to introduce steam into the charge while undergoing carbonization.

While I have described the preparation of a structural activated char employing certain mixtures and conditions, it is to be understood that these examples are merely for illustrative purposes, as many possible combinations between the various classes of carbons and binder material that char on heating, such as those shown or mixtures, may be made.

In general, the carbons may be distinguished from the binders in that the carbons are not liquefied nor do they soften by relatively low temperature heat treatment and usually the amount of volatile matter is less than non-volatile, whereas generally the binders do soften or liquefy by heat treatment and are usually higher in volatile matter. However, the carbons may contain considerable volatile and/or binding matter on the one hand and may undergo some caking when heated to high temperatures, and the binders may contain considerable free carbon on the other. The binders may be materials of a pitchy, asphaltic, resinous or similar characteristic which may be in a non-fluid or solid state, or which may be of such melting point characteristics as to conform to the shape of the containing vessel. Pitches, particularly those obtained from coal tars and similar tars, are preferred as binders, although those from other tars and petroleum may be employed.

It is usually preferred that the carbon base be ground to 200 mesh or above, although approximately 50 mesh and above may be found satisfactory.

Apparently the carbonization of the binder while in contact with the active carbon present in the mixture causes the formation of an active carbon or one which is easily rendered active.

Various mixtures of carbon bases, such as coke from various oils, tars or pitches, preferably from petroleum, coal, etc. and wood, preferably hardwood charcoal, have been used, varying from 10 per cent or less of wood char to 90 per cent or more of coke, and vice versa. The mechanical structure improves within limits with the lower percentages of active carbon; however, the activity of the finished product must be considered in determining the minimum percentage of active carbon to be employed. The ratio of carbon base to pitch (on the basis of hard pitch) may be 1.5 to 6 of carbons to 1 of pitch, with a preferred ratio of approximately 2 to 1 where the coke in the carbon mixture contains only a small amount of volatile matter, and a ratio of approximately 5 to 1 where the volatile matter in the coke is high, e. g., above 16 per cent, and shows a tendency to cake at high temperatures. In general, as the volatile matter in the pitch changes its relative proportion is changed within certain limits.

The proportions of various materials are given as examples and they may vary more widely depending upon the results desired, e. g., a larger proportion or ratio of carbons to binder may be employed in some cases.

I have found that certain mixtures produce superior results with respect to structural strength or resistance to shattering, abrasion, attrition and the like of the granular product, e. g., when employing cokes as a carbon base, e. g., petroleum coke and a vegetable carbon, e. g., hardwood char, not only the decolorizing properties of the product are improved but the structural strength of the product is very greatly improved. As a specific example of such a mixture may be cited: petroleum coke, 80 to 90 parts by weight; hardwood charcoal, 10 to 20 parts. The binder ratio may be less than 2:1 for low volatile coke, as in the previous case, and higher than 4:1 for high volatile cokes, preferably employing coal tar pitch as the binder, which produces a product of superior structural strength.

The binder in the above cases may be incorporated in the mixture in any of the manners described but preferably is incorporated in an emulsified state or as a finely divided hard pitch and mixed afterward with an oil or tar, or vice versa, as described above.

The product of the present process has a superior adsorption or decolorizing efficiency very much higher than the product from inactive mineral carbon alone, with an improved structure and mechanical strength, the latter being particularly very much greater than when active carbon alone is employed.

As specific examples of results obtained the following are given:

| Carbon base | Binder | Approximate % decolorization of standard solution raw sugar (Tests based on 15-80 mesh) (1) (2) |
|---|---|---|
| 50% hardwood char 50% petroleum coke | Wood tar pitch | 82—86 |
| 50% hardwood char 50% petroleum coke | Coal tar pitch | 82—84 |
| 25% hardwood char 75% petroleum coke | Wood tar pitch | 82—84 |
| 25% hardwood char 75% petroleum coke | Coal tar pitch | 77—82 |
| 12½% hardwood char 87½% petroleum coke | Wood tar pitch | 70—75 |
| 12½% hardwood char 87½% petroleum coke | Coal tar pitch | 70—80 |
| Petroleum coke | ----do---- | 33—35 |
| 25% hardwood char 75% petroleum coke | Petroleum asphalt or pitch | 70—73 |
| 12½% hardwood char 87½% petroleum coke | ----do---- | 65—68 |
| Petroleum coke | ----do---- | 30—33 |

From the viewpoint of structure and mechanical strength of the resulting products, the coal tar pitch binder is preferred.

The products of the process were regenerated numerous times with very little depreciation in structure and activity.

A highly superior and desirable product from the view-point of relatively low cost possessing a mechanical structure and decolorizing efficiency far superior to high grade bone black was produced according to the process as described when employing, e. g., a mixture containing 12½ per cent hardwood char, 87½ per cent petroleum coke and a coal tar pitch binder. The mechanical strength of this particular product was twice that of high grade bone black and the actual decolorizing efficiency and regenerative properties far superior to the latter.

The binder ratio based on pitch in the mixture in the above cases was approximately 1.8:1 to 2:1 where the volatile matter in the coke was less than 8 per cent and 4:1 to 5:1 where the volatile matter exceeded 16 per cent, with intermediate proportions as required. For structural purposes binder ratios of less than 2.5:1 are preferred where the coke contains only a small per cent of volatile matter. The structural and wearing quality of the products were much superior where coal tar pitch was employed as a binder than where wood tar pitch was employed. Binders from petroleum, e. g., pitches, asphalts, etc. from straight run and cracked oils, may also be employed.

When the product was very finely divided better results than those shown above were obtained. The products containing hardwood char (above) were acid treated as described.

The coke used in the above cases was from the destructive distillation, including cracking, of petroleum or its fractions. Other cokes, e. g., from coking of tars and pitches, also give good results. Other vegetable chars also give good results when replacing hardwood char, although the latter is preferred.

For comparison, a good grade of bone black on the above decolorizing scale and under comparable conditions of test would show an average of 65 per cent or less, employing equal volumes. Generally the boneblack is higher in density than the chars of the present process, and the tests show that the present chars are even more active and efficient than is shown by this comparison if made on the basis of employing sufficient bone black to decolorize to the same extent as the present chars.

In the above examples the pitch was in an emulsified condition or added direct as a hard pitch. The oil used in the examples is on the basis of approximately 20 to 50 per cent by weight of pitch employed. (If soft pitch is used directly, equivalent amounts may be employed.) This ratio may, of course, be changed depending on the results desired and materials employed. Creosote oil or anthracene oil may be employed and are preferred, but other coal tar distillates and wood tar or similar distillates, tars and petroleum oils, e. g., cracked liquid residues, may be employed. The weight of pitch employed is on the basis of a hard pitch melting at approximately 200° F. to 250° F. This data is given simply to characterize the proportion used in the above examples rather than to limit it, and of course it must be borne in mind that the results obtained may not be equivalent for various combinations.

By "binder ratio" is meant the amount of carbon to pitch employed, e. g., 2:1 means 2 parts by weight of carbon to 1 part pitch. By the term "compressing" in the claims is meant subjecting the mixture to pressure of any form e. g., molding, briquetting, extruding, rolling and the like.

Results comparable to those shown may be obtained by the other modifications described herein but the method used in these specific cases is preferred.

The above examples are given for illustrative purposes only, and it may be readily recognized that many combinations of carbon base and binder may be employed and many mixtures of various carbon bases may be employed and combined with various types of binders, either alone or in admixture. It may be also recognized that the conditions of treatment, such as temperatures of carbonizing and activation, may vary, all within wide limits. Also, that in regard to the quality of the resulting product the extent of decolorization or refining may be much higher than that shown in the table, depending on conditions of the test, the amount and kind of material to be treated, and the particular product being tested. Hence, the specific examples are not to be considered as limitations upon the broad scope and spirit of the invention.

I claim as my invention:

1. A process for the production of structural activated carbon suitable for refining, purifying and decolorizing purposes which comprises mixing mineral carbon of the class consisting of coals and cokes with an active carbon and with a binder which chars on heating, compressing the mixture under substantial pressure, subjecting the compressed material to a temperature adequate to carbonize and to char the binder, and then activating the resulting product.

2. A process for the production of structural activated carbon suitable for refining, purifying and decolorizing purposes which comprises mixing mineral carbon of the class consisting of coals and cokes with a non-mineral carbon and with a binder which chars on heating, compressing the mixture under substantial pressure, subjecting the compressed material to a temperature adequate to carbonize and to char the binder, and activating the resulting product by heating in the presence of a gas having a mild oxidizing action.

3. A process for the production of structural activated carbon suitable for refining, purifying and decolorizing purposes which comprises mixing mineral carbon base comprising a petroleum coke with an active carbon and with a binder which chars on heating, compressing the mixture under substantial pressure, comminuting the compressed material, and subjecting the comminuted material to a temperature adequate to carbonize and to char the binder, and activating the resulting product by heating in the presence of steam.

4. A process for the production of structural activated carbon suitable for refining, purifying and decolorizing purposes which comprises mixing an inactive mineral carbon base comprising a coal with an active carbon and with a binder which chars on heating, compressing the mixture under substantial pressure, comminuting the compressed material, and subjecting the comminuted material to a temperature adequate to carbonize and to char the binder, and activating the resulting product by heating in the presence of steam.

5. A process for the production of structural activated carbon suitable for refining, purifying and decolorizing purposes which comprises mixing mineral carbon of the class consisting of coals and cokes and carbon comprising a vegetable char and with a binder which chars on heating, compressing the mixture under substantial pressure, subjecting the compressed product to a temperature adequate to carbonize and to char the binder therein, and activating the resulting product by heating in the presence of a gas having a mild oxidizing action.

6. A process for the production of structural activated carbon suitable for refining, purifying and decolorizing purposes which comprises mixing mineral carbon comprising petroleum coke and carbon comprising a wood char and with a binder which chars on heating, compressing the mixture under substantial pressure, comminuting the compressed material and subjecting the comminuted product to a temperature adequate to carbonize and to char the binder therein, activating the resulting product by heating in the presence of steam and subjecting the charred and activated product to the action of an acid to remove undesirable impurities.

7. A process for the production of structural activated carbon suitable for refining, purifying and decolorizing purposes which comprises subjecting a mixture of mineral carbon base comprising coke and carbon comprising a carbon black and with a binder which chars on heating, compressing the mixture under substantial pressure, comminuting the compressed material and subjecting the comminuted product to a temperature adequate to carbonize and to char the binder therein, and activating the resulting product by heating in the presence of steam.

8. A process for the production of structural activated carbon suitable for refining, purifying and decolorizing purposes which comprises mixing mineral carbon comprising coke and carbon comprising a carbon of animal origin and with a binder which chars on heating, compressing the mixture under substantial pressure, comminuting the compressed material and subjecting the comminuted product to a temperature adequate to carbonize and to char the binder therein, and activating the resulting product by heating in the presence of steam.

9. A process for the production of structural activated carbon suitable for refining, purifying and decolorizing purposes which comprises mixing inactive mineral carbon of the class consisting of coals and cokes with a non-mineral carbon and with a binder which chars on heating, compressing the mixture under substantial pressure, subjecting the compressed material to a temperature adequate to carbonize and to char the binder, activating the resulting product by heating in the presence of a gas having a mild oxidizing action, and subjecting the charred and activated product to the action of a solvent capable of removing undesirable impurities.

10. A process for the production of structural activated carbon suitable for refining, purifying and decolorizing purposes which comprises mixing carbon of the class consisting of coals and cokes with carbon comprising a vegetable carbon and with a binder which chars on heating, compressing the mixture under substantial pressure, comminuting the compressed material, and subjecting the comminuted material to a temperature adequate to carbonize and to char the binder, activating the resulting product by heating in the presence of steam, and subjecting the charred and activated product to the action of an aqueous solution of an acid.

11. A process for the production of structural activated carbon suitable for refining, purifying and decolorizing purposes which comprises mixing carbon comprising petroleum coke with carbon comprising a wood char and with an emulsion of a binder comprising coal tar pitch, compressing the mixture under substantial pressure, comminuting the compressed material, subjecting the comminuted material to a temperature adequate to carbonize and to char the binder, activating the resulting product by heating in the presence of steam and subjecting the charred and activated product to the action of an acid to remove undesirable impurities.

12. A process for the production of structural activated carbon suitable for refining, purifying and decolorizing purposes, which comprises compressing a mixture of an inactive mineral carbon of the class consisting of coals and cokes and a non-mineral carbon and a binder which chars on heating, subjecting the compressed material to a temperature adequate to carbonize and to char the binder and activating the resulting product by heating in the presence of a gas having a mild oxidizing action.

13. A process for the production of structural activated carbon suitable for refining, purifying and decolorizing purposes, which comprises mixing inactive mineral carbon of the class consisting of coals and cokes with an active carbon and with an emulsion of a binder which chars on heating, compressing the mixture under substantial pressure, subjecting the compressed material to a temperature adequate to carbonize and to char the binder, and activating the resulting product by heating in the presence of a gas having a mild oxidizing action.

14. A process for the production of structural activated carbon suitable for refining, purifying and decolorizing purposes, which comprises mixing mineral carbon of the class consisting of coals and cokes with a carbon comprising a vegetable char and with an emulsion of a binder which chars on heating, compressing the mixture under substantial pressure, subjecting the compressed material to a temperature adequate to carbonize and to char the binder, activating the resulting product by heating in the presence of steam and subjecting it to the action of an acid to remove undesirable impurities.

15. Activated carbon comprising the activated product of a mixture of an active carbon and an inactive mineral carbon of the class consisting of coals and cokes and a uniformly distributed carbonized binder.

16. Activated carbon comprising the activated product of a mixture of non-mineral carbon and mineral carbon of the class consisting of coals and cokes and a uniformly distributed carbonized binder.

17. An activated carbon comprising the activated product of a mixture of vegetable char and coke and a uniformly distributed carbonized binder.

18. Activated carbon comprising the activated product of a mixture of wood char and coke and a uniformly distributed carbonized binder.

19. Activated carbon comprising the activated product of a mixture of carbon black and coke and a uniformly distributed carbonized binder.

20. Activated carbon comprising the activated product of a mixture of a char of animal origin and coke and a uniformly distributed carbonized binder.

21. Activated carbon comprising the activated product of a mixture of bone char and coke and a uniformly distributed carbonized binder.

JACQUE C. MORRELL.